United States Patent

[11] 3,599,023

| [72] | Inventor | Gerald W. Bottrell<br>4321 Rosemont Ave., Montrose, Calif. 91214 |
|---|---|---|
| [21] | Appl. No. | 877,131 |
| [22] | Filed | Nov. 17, 1969 |
| [45] | Patented | Aug. 10, 1971 |

[54] SINGLE PHASE INDUCTION MOTORS
18 Claims, 7 Drawing Figs.

[52] U.S. Cl. .................................................. 310/166,
310/68 A, 310/72, 310/207, 310/210
[51] Int. Cl. ................................................ H02k 17/00
[50] Field of Search ........................................... 310/166,
174, 167, 211, 205, 206, 207, 72, 172, 180, 184,
198, 210, 68, 203, 68.5; 318/199, 222

[56] References Cited
UNITED STATES PATENTS

| 2,013,821 | 9/1935 | Yost | 310/202 |
|---|---|---|---|
| 2,470,663 | 5/1949 | Stein | 310/180 |
| 2,622,217 | 12/1952 | Anderson | 310/166 |
| 2,807,736 | 9/1957 | Jensen | 310/184 |
| 2,999,953 | 9/1961 | Levy | 310/166 |
| 2,999,954 | 9/1961 | Levy | 310/166 |
| 3,144,597 | 8/1964 | Lee | 310/166 |
| 3,321,653 | 5/1967 | Sonoyama | 310/180 |

Primary Examiner—Milton O. Hirshfield
Assistant Examiner—R. Skudy
Attorney—Edward D. O'Brian ABSTRACT: Self-starting, single-phased induction motors can be constructed using a rotor and a stator in which the magnetic poles caused by the current flowing through the coils of the stator and caused by induced currents in the bars of the rotor are preferably displaced from one another about 90 electrical degrees around the axis of the rotor at one of the ends of the motor, while they are positioned opposite one another in a conventional manner at the other end of the motor. In a motor of this invention, auxiliary windings are located at the first of these ends in the stator displaced from the stator winding. Preferably they are displaced an amount of about 90 electrical degrees.

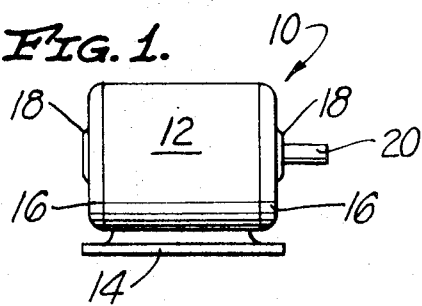
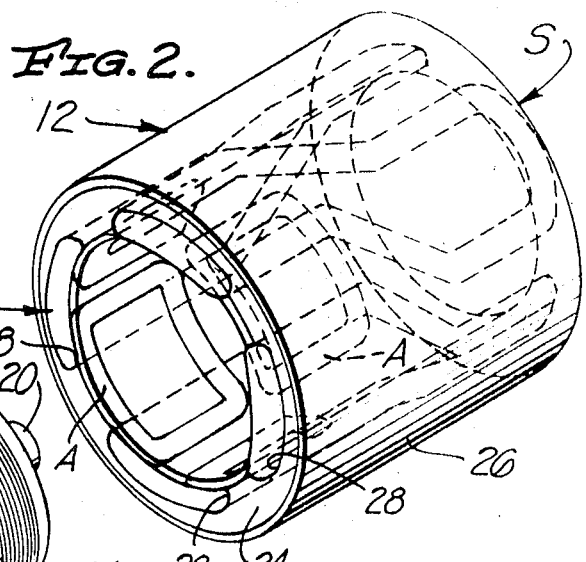
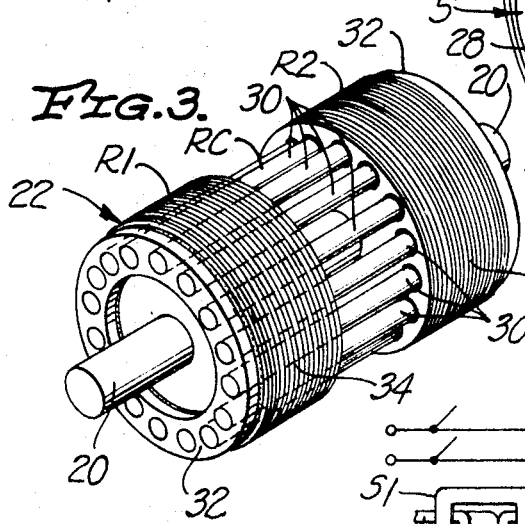
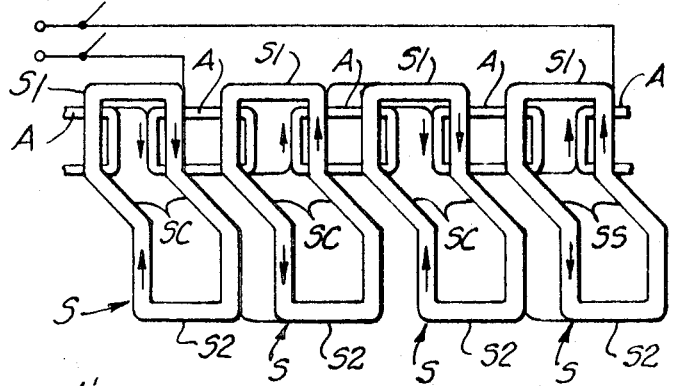
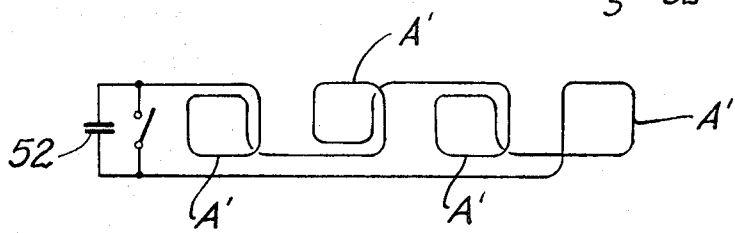
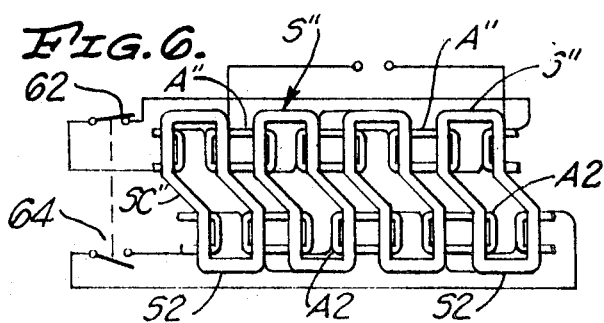
INVENTOR
GERALD W. BOTTRELL
BY
EDWARD D. O'BRIAN
ATTORNEY

SINGLE PHASE INDUCTION MOTORS

BACKGROUND OF THE INVENTION

The invention set forth in this specification pertains to single phase induction motors such as are commonly constructed utilizing a stator and a rotor rotatably mounted adjacent to the stator. In such motors the stator normally contains a plurality of stator coils. As a motor of this type is operated, a current is passed through these coils so that each of these coils sets up a magnetic field. These fields are used so as to generate currents in so-called rotor bars or conductors in the rotor. The passage of such currents in the rotor create counter magnetic fields which interact with the fields created by the stator coils so as to cause rotor rotation.

Normally single-phase induction motors of the type indicated utilize a hollow cylindrical stator and a cylindrical rotor fitted within such a stator. However, motors of this type can be of so-called "pancake" or other types where tow surfaces—the surfaces of the rotor and the stator are located adjacent to and opposite one another. Motors as described can be modified in many different ways. Thus, for example, these motors can employ different types of stator coils, different numbers of such coils, different types of rotor constructions and the like.

Single-phase induction motors as described are not capable of starting rotation when a current is applied to them unless they are specially constructed in some way so as to cause initial rotation of the rotor. In order to cause such initial rotation, such motors have been constructed so as to utilize so-called "shaded poles" in the stator. Such shaded pole motors are designed so as to create an unbalance in the magnetic fields created by the passage of current through the stator coils in order to effect the rotors within such motors so that they will turn. It has also been proposed to remedy the starting problem utilizing split phase motors with starting switches, capacitor starting motors with starting switches which cut the capacitors used out of the circuit used to supply current to the stator after such motors begin operation; and so-called capacitor motors which include a capacitor in the running circuit with the stator windings. Frequently these latter motors are referred to as capacitor run motors.

It is considered unnecessary to set forth in the specification a detailed analysis of each of the various different types of self-starting single-phase induction motors indicated in the preceding. Such motors are described in detail in appropriate common texts. While such motors are utilitarian it is considered that it is commonly recognized that none of such motors is completely desirable for anyone of a series of different reasons.

In the main, such reasons pertain to performance characteristics and cost considerations. The starting switches used with certain types of motors as indicated are believed to unnecessarily add to the costs of such motor. On occasion such starting switches fail to perform satisfactorily. Certain of such motors do not possess as high a starting torque as is desired for many applications. Certain of such motors have relatively high starting currents. Certain of such motors are not efficient from an electrical standpoint as they are operated.

SUMMARY OF THE INVENTION

An objective of this invention is to provide new and improved single-phase induction motors. More specifically an objective of this invention is to provide motors of this type which possess relatively high starting torques, which have relatively low starting currents and which can operate efficiently from an electrical standpoint. Other objectives of this invention are to provide motors of the class described which can be manufactured at a competitive cost, which are capable of giving prolonged reliable performance and which can be reversed if this should be desired.

In accordance with this invention these and various related objectives of it are achieved by constructing the rotor and the stator in an induction motor in such a manner that the magnetic poles caused by a current flowing through the coils of the stator and caused by induced currents in the bars of the rotor are displaced from one another at what may be called first extremities of the rotor and stator while such poles at what may be called second extremities of the rotor and stator are located opposite one another and by incorporating within the stator at the first end thereof auxiliary windings displaced from the stator windings at this first end. For best results the poles caused by currents flowing through coils are displaced from 45 to 135 electrical degrees apart, and preferably 90 electrical degrees apart. Similarly the auxiliary windings should be displaced from the stator windings at the first end from 45 to 135, and preferably 90 electrical degrees for best results.

The invention has many features which cannot be indicated in a brief summary of this type.

BRIEF DESCRIPTION OF THE DRAWING

Such features will be apparent from a detailed consideration of the remainder of this specification and of the accompanying drawing in which:

FIG. 1 is a side-elevational view of a presently preferred embodiment or form of an electric motor of this invention;

FIG. 2 is an isometric view of the stator in the motor shown in FIG. 1 in which only parts of lamination are shown so that various internal parts and structures may be seen;

FIG. 3 is an isometric view of the rotor in the motor shown in FIG. 1;

FIG. 4 is a diagrammatic layout view showing the nature of the stator windings as may be used in the stator shown in FIG. 2;

FIG. 5 is a diagrammatic view showing modified auxiliary windings as may be used in the stator illustrated in the preceding figures;

FIG. 6 is a diagrammatic layout view showing the nature of modified stator windings as may be used in the stator shown in FIG. 2.

Figure 7:
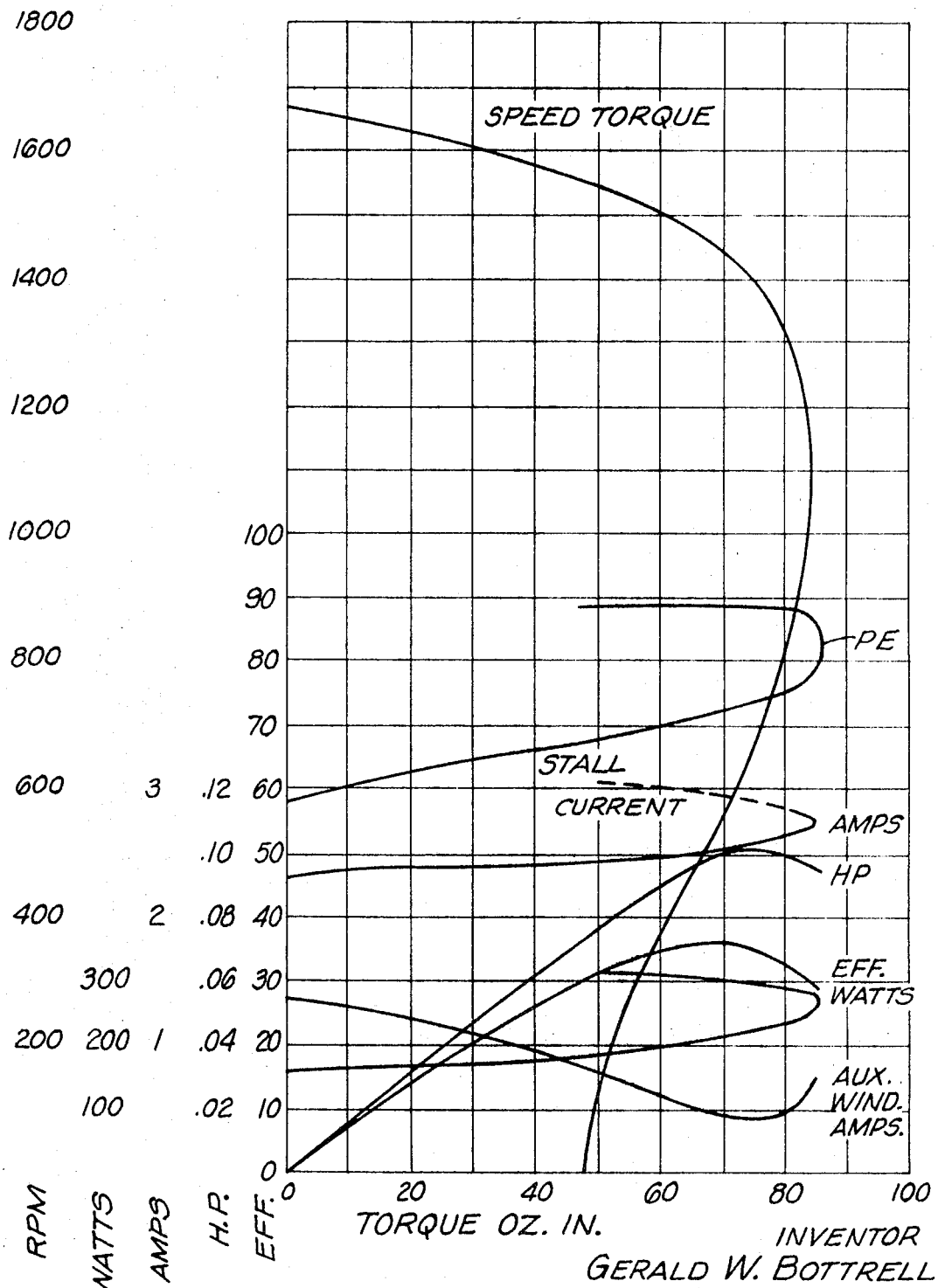
FIG. 7 is a composite of curves showing electrical and mechanical information with respect to the performance of a relatively crude prototype of an electric motor as illustrated in the preceding figures.

The accompanying drawings are primarily intended to illustrate the nature of a motor of this invention and the general character of the performance of such a motor for explanatory purposes. It will be realized that actual motors in accordance with this invention may be designed in different manners through the use of routine electrical engineering skill on the basis of the disclosure embodied herein. It will also be realized that the precise performance characteristics of each such motor will depend upon the manner in which it is constructed, and that motors constructed in accordance with this disclosure will, because of variation in their construction have performance characteristics which are not identical with those disclosed.

DESCRIPTION OF THE PREFERRED EMBODIMENT

In the drawing there is shown a single-phase induction motor 10 of the present invention having a stator 12 which is attached to and carried by a base 14. This stator 12 carries end bells 16 provided with centrally located bearings 18. These bearings carry a shaft 20 of a rotor 22. The interior of the stator 12 is of the useful cylindrical configuration; the exterior of the rotor 22 is also of the usual cylindrical configuration and is dimensioned so as to fit closely adjacent to the interior of the stator 12.

The stator 12 is formed using conventional laminations 24 which are preferably supported with a housing 26. If desired known approximate equivalents for the laminations 24 such as ferrite structures may be substituted for these laminations. As formed the laminations 24 include slots 28 exposed to the interior surface of the stator 12 which are intended to contain stator coils or windings S and auxiliary coils or windings A.

These stator windings S are connected together in a series in accordance with conventional motor practice so that current will flow through them in series as indicated by the arrows in them in FIG. 4 of the drawing. They may also be connected in other conventional manners such as series-parallel or parallel.

The stator windings S are disposed in the slots 28 so as to have first ends S1 displaced from second ends S2 by diagonally extending center sections SC. These ends S1 and S2 are preferably located about the axis of the stator 12 so as to be offset with respect to one another by an amount corresponding to about 90 electrical degrees. The precise amount in physical degrees of such an offset will depend upon the number of the coils S utilized. The amount of this offset in electrical degrees can be varied extremely widely. For operation it is only necessary that there be some displacement. It is presently considered that for satisfactory operation such displacement should be from 45 to 135 electrical degrees. Presently preferred results are achieved when this displacement is 90 electrical degrees as shown.

The construction shown uses the same number of auxiliary windings A as stator windings S in the construction shown. These auxiliary windings A are connected in series so as to overlap the ends S1 of adjacent stator windings S, but if desired they could be located between the ends S2 of adjacent stator coils S. In either eventuality they are located so as to be offset with respect to the coil end S1 or S2 where they are located. Preferably this offset is in the amount of 90 electrical degrees. Again the precise amount of each offset in physical degrees will depend upon the number of coils S utilized. For operation it is only necessary that there be some offset or displacement between the windings A and the ends S1 or S2 where they are located. At present it is 90 that for satisfactory operation the amount of such offset should be from 45 to 135 electrical degrees, and that preferred results are achieved with the 90 electrical degree offset shown.

With the construction shown the rotor 22 includes the usual electrically conductive rotor bars 30 extending between electrically conductive end rings 32. Preferably the total distance between the remote surfaces of these end rings 32 is approximately the total distance between the extremities of the stator 12 in accordance with conventional practice. The rotor 22 preferably includes conventional laminations 34 or substantial or approximate equivalents such as known ferrite structures.

The rotor 22 differs from conventional rotors in that these laminations are broken up into groups adjacent to the end rings 32 in order to divide the complete rotor 22 into rotor sections R1 and R2 located opposite the stator coil ends S1 and S2, respectively. These rotor sections R1 and R2 may be termed rotor ends. Although in the embodiment shown these sections R1 and R2 are separated from one another by a rotor section RC which only contains the rotor bars 30 these sections R1 and R2 can be directly connected.

With this construction the rotor section R1 is located adjacent and opposite to coil ends S1 so as to be influenced by the magnetic fields eminating from the coil ends S1. Similarly the rotor sections R2 will rotate opposite and adjacent to the coil ends S2 so as to be influenced by magnetic fields eminating from these coil ends. Because of the inherent nature of magnetic fields a field at either coil end S1 or S2 will overlap the field at the other end. With the motor 10 this will cause a reenforcement of the magnetic fields because of the fields at the ends of the stator are 90 electrical degrees displaced with one another. In other words the magnetic fields created in the ends of the stator are utilized in such a manner that they do not oppose rotation of the rotor 22. If desired the laminations may be omitted in the stator 12 in the region of the center coil sections SC so as to facilitate manufacture.

In the motor 10 the auxiliary windings A are connected in an endless series as shown in FIG. 4. During the operation of the motor 10 at an initial or "stall condition" current is applied to the stator coils S. This will cause the excitation of what in effect are two different magnetic fields in each coil S. The first of these fields will be at the ends S1 of such coils and the second of these fields will be at the ends S2 of these coils. These fields created by a single-coil S will be offset from one another around the axis of the rotor 22 by an amount of 90 electrical degrees as shown. These fields at the ends S1 and S2 will cause the excitation of separate currents in the rotor bars 30. Such currents will flow in rotor bars 30 which are parallel to one another. Such currents will be in rotor bars 30 will be displaced about 90 electrical degrees around the axis of the rotor 22.

The current excited in a rotor bar 30 by a coil end S2 in the rotor section R2 will flow to the rotor section R1 opposite the coil ends S1. There each such current will be displaced by about 90 electrical degrees around the axis of the rotor 22 from the current generated in the rotor bar 30 opposite the next coil end. In a similar manner the current generated in each rotor bar 30 by a coil end S1 at the rotor section R1 will flow to the rotor section R2 where it will be offset from the corresponding coil S2 by an amount of about 90 electrical degrees around the axis of the rotor 22 from the current generated by the coil end S2 corresponding to the generating coil end S1.

The currents caused in this manner in the rotor 22 by the fields generated at the coil ends S2 are considered to travel in the rotor 22 to the rotor section R1. There such currents are considered to generate other magnetic fields which extend from the rotor section R1 into the area occupied by the auxiliary windings A and the coil ends S1. It will be noted that prior to this occurring no fields have been excited which will effect the auxiliary windings A because of the phase relationship of the coil ends S and the auxiliary windings A.

The rotor magnetic fields which will be created by the currents flowing in the rotor section R1 will extend from the physical confines of the rotor 22. Such rotor fields will extend in the areas occupied by the auxiliary windings A. There they will excite a further current which will pass through the endless windings A. Such a further current in the auxiliary windings A will in turn create magnetic fields which will act in opposition to what are referred to herein as the rotor magnetic fields. As the result of this the excited magnetic fields created by the auxiliary windings A will "buck" or be in opposition to the rotor magnetic fields. This unbalance of magnetic fields will produce a torque which will start rotation of the rotor 22.

The condition existing at the start of such rotation is best explained with reference to FIG. 7 of the drawings. This figure contains a number of performance curves based on the performance of a particular somewhat crude prototype motor constructed as shown in the initial four figures of the drawing operated using a 116 volt, single-phase, 60 cycle current. Because of the nature of the prototype tested it is doubted if any other motors constructed in accordance with this invention will have exactly the performance characteristics shown in FIG. 7. However, it is believed that the characteristics shown are adequate to facilitate a knowledge and understanding of the nature of motors in accordance with this invention.

From the speed-torque curve in FIG. 7, it will be seen that the torque of the motor 10 gradually increases from an initial or "stall" condition as shown at the bottom of this curve to a maximum and that the torque of the motor 10 then drops off at a comparatively rapid rate. While the speed torque characteristics of the motor 10 are significant, they must be considered in connection with the other performance characteristics of the motor 10, and in particular, the current curve shown in FIG. 7. This curve shows that the current drawn by the motor 10 gradually decreases from an initial "stall" current as the torque increases, and that then the current drawn by the motor 10 gradually decreases as the torque of the motor 10 increases. A major feature of the invention is considered to be the relative quantities of current consumed by the motor 10 during operation as shown by the curve relating to current in FIG. 7.

The power factor curve in FIG. 7 has a shape which is related to the shape of current curve. It will be seen from an initial or stall condition the power factor gradually falls off at a comparatively slow rate as the torque of the motor 10 picks up, and that the power factor then decreases as the torque of the motor 10 increases. It will also be noted that the curve showing the total power consumed by the motor 10 in watts has the same type of shape as the current and power factor curve. The shapes of these three curves should be contrasted with the shapes of three other curves shown in FIG. 7.

The curve labeled horse power in FIG. 7 shows that the power output of the motor 10 increases in an almost linear fashion from zero at an initial stall condition and reaches a maximum at a point just pass the maximum torque of the motor 10 and then decreases to a very minor extent. The curve in FIG. 7 showing the efficiency of the motor is of a similar character, having a maximum corresponding to the maximum of the horsepower curve. These two curves more or less correspond to a reversely shaped curve in FIG. 7 indicating the current actually flowing in the auxiliary winding A of the motor 10. This auxiliary winding current curve starts off at a relatively high value at an initial "stall" condition and then as the motor picks up speed torque decreases to a minimum corresponding to the maximums of the efficiency and horsepower curves and then decreases a slight amount.

The precise shape of this curve showing the current in the auxiliary windings A can be changed by varying the nature of the auxiliary windings A. Such variation can be achieved by changing the number of turns of wire in the auxiliary windings A, the size of the wire in the auxiliary windings A, the dimensions and spacing of the coils in the auxiliary windings A and the like. A quite important factor as to the shape of this curve showing the auxiliary windings current is the amount of displacement in electrical degrees of the auxiliary windings A and the coil ends S1 and S2. This displacement has previously been described in connection with what is considered to be a preferred motor of this invention.

As an example of the variation possible within the auxiliary windings A these windings may consist of a plurality of coils, each of which consists of a single turn of a conductor. In the presently preferred embodiment illustrated the auxiliary windings A contain approximately the same number of turns of a conductor in each of the coils as does the stator winding S in each of its coils. It is presently considered preferable to form the auxiliary windings A so that the same number of turns are used in each of the coils of this winding. This is merely to prevent an unbalanced electrical situation between various parts of the auxiliary windings A.

The operating characteristics of the motor 10 of this invention can be changed through the use of an auxiliary windings A' as shown in FIG. 5 of the drawing. These auxiliary windings A' differ from the windings A previously described in that they are not what may be referred to as an endless winding. Instead it includes a capacitor 52 connected in series between the ends of the windings A'. This capacitor is considered to change the impedance of the auxiliary windings A' so that it is possible for a greater amount of current to flow in the auxiliary winding A' than if this winding A' was connected so as to be "shorted out" in an endless series. This is considered to improve the starting and running performance of a motor such as the motor 10 previously described. A motor using the auxiliary winding A' has a higher power factor because of the use of the capacitor 52 than if this capacitor 52 was omitted and if this winding A' was connected in an endless series.

In FIG. 6 there is shown a diagrammatic layout view which is extremely similar to FIG. 4. For convenience of explanation, various parts of FIG. 6 which are identical to various parts of FIG. 4 are separately identified herein and in the drawing by the double primes of the letters previously used to designate such parts. From an examination of FIG. 6 it will be noted that it differs from FIG. 4 primarily by including a second set of auxiliary windings A2 located at the coil ends S2 in the same electrical displacement relationship with the coil ends S2 as auxiliary windings A have located with respect to the coil ends S1. In an actual motor the auxiliary windings A2 are located in slots in a stator in the same manner as auxiliary windings A.

With the structure shown in FIG. 6 the auxiliary windings A" and A2 include or are connected in series with switches 62 and 64, respectively. When one of these switches is open, the other is closed. By varying which of these switches is open and which of these switches is closed, it is possible to reverse the direction of rotor rotation in a motor having a stator constructed with windings as indicated in FIG. 6. Such reversal can be achieved even when a rotor is running full speed in either direction. This is considered to be quite significant and quite important for certain applications. If desired either or both of the auxiliary windings A" or A2 as shown in FIG. 6 may include a capacitor in the manner indicated in FIG. 5.

A motor in accordance with this invention can also be modified in many other ways so as to obtain the type of operation achieved with the motor 10 and the various modified embodiments of it described. For convenience of construction it is possible to use various auxiliary windings as described with conventional stator windings having ends aligned with one another and to achieve the spacial relationships or displacements indicated in this specification by providing offsets corresponding to the offsets in the stator illustrated in the rotor employed by making the rotor bars in such a rotor cant at an angle or by making the rotor bars of a substantially Z-type of shape so that in either case the ends of them are displaced with respect to one another as described.

For convenience of construction it is also possible to create a motor in which the spacial relationships or displacements described are achieved by both skewing the rotor bars and by offsetting or skewing the stator windings. In either of these two types of constructions, the spacial relationships or displacements between the ends of the stator windings and any auxiliary winding used must be maintained.

From this discussion it is not to be assumed that the invention is limited to the precise type of motor shown. The basic features of it can be applied to other types of motors such as pancake motors of very simple motors employing a single stator coil on the basis of the disclosure embodied herein through the use of exercise of routine engineering skill.

An understanding of motors as described is best obtained by considering that this invention pertains to motors which obtain their starting torque as a result of time delayed flux fields similar to the time delayed flux fields obtained in conventional-shaded pole motor. There is, however, an important distinction between the motors of the present invention and such shaded pole motors. In the motors of the present invention the time delayed flux fields are created through excitation of the auxiliary windings as the result of current flow within the rotor of such a motor. This is to be contrasted with shaded pole motors in which time delayed flux fields are obtained as a result of a shorted winding around a section of the stator poles.

Because of the fact that the time delayed flux field in a motor of this invention is obtained by rotor excitation, the motors of the invention differ significantly from shaded pole motors. The result of the manner of obtaining such a time delayed flux field in a motor of this invention, the high losses normally present in a shaded pole motor during full-speed operation are reduced in a motor of this invention during full-speed operation. This is because in a motor of the invention the speed effects induced or generated in the auxiliary winding, which reduces the time delayed flux fields, at rated power operation.

I claim:

1. In an AC single phase induction motor having a stator and rotor,
    said stator having an axis and said rotor being mounted so as to rotate about said axis,
    said stator having stator coil means for creating stator magnetic flux, said coil means being adapted to be connected to an AC current source,
    said rotor having electrical conductors extending in the direction of the length of said stator coil means and means electrically connecting the ends of said conductors,
    the improvement which comprises:

auxiliary winding means for creating a time delayed magnetic flux field in response to current flow in said conductors in said rotor, said auxiliary winding means being unconnected to said current source, said auxiliary winding means being located within said stator and extending only part of the length of said stator coil means and of said rotor and being positioned with respect to said stator coil means so the magnetic poles caused by current flow in said auxiliary winding means are physically displaced from the magnetic poles created by current flowing through said stator coil means, the extremities of said conductors and said stator coil means being physically displaced from one another so that the magnetic poles produced by current flowing through said conductors are displaced from the magnetic poles produced by said stator coil means.

2. An induction motor as claimed in claim 1 wherein:
the extremities of said conductors and said stator coil means are displaced from one another at one of the ends of said rotor and said stator in an amount of from about 45 to about 135 electrical degrees around said axis.

3. An induction motor as claimed in claim 1 wherein:
the extremities of said conductors and said stator coil means are displaced from one another at one of the ends of said rotor and said stator in an amount of about 90 electrical degrees around said axis.

4. An induction motor as claimed in claim 1 wherein:
the ends of said stator coil means at the ends of said stator are displaced around said axis so as to achieve said displacement of the extremities of said conductors and said stator coil means.

5. An induction motor as claimed in claim 1 wherein:
said auxiliary winding means includes an auxiliary coil means, the ends of said auxiliary coil means being directly connected to one another so as to short out said auxiliary winding means and connect said auxiliary coil means in an endless series.

6. An induction motor as claimed in claim 1 wherein:
said auxiliary winding means includes an auxiliary coil means, the ends of said auxiliary coil means being connected to one another through a capacitor.

7. An induction motor as claimed in claim 1 including:
a second auxiliary winding means located within said stator and positioned with respect to said stator coil means so that the magnetic poles caused by current flow in said second auxiliary winding means are displaced from the magnetic poles created by current flowing through said stator coil means and are displaced from the magnetic poles created by current flowing through said stator coil means, and from the magnetic poles created by current flowing through said first mentioned auxiliary winding means, and switch means for controlling current flow in both of said auxiliary winding means, said switch means being capable of connecting extremities of either of said auxiliary winding means so as to short out the same in an endless path when the extremities of the other of said auxiliary winding means are not connected so that no current will flow through the other of said auxiliary winding means, the direction of said rotor rotation being dependent upon which said auxiliary winding means has its extremities connected.

8. An induction motor as claimed in claim 1 wherein:
said auxiliary winding means are located within said stator so that the magnetic poles caused by current flow in said auxiliary winding means are displaced from the magnetic poles created by current flowing through said stator coil means in an amount of from about 45 to about 135 electrical degrees around said axis.

9. An induction motor as claimed in claim 1 wherein:
said auxiliary winding means are located within said stator so that the magnetic poles caused by current flow in said auxiliary winding means displaced from the magnetic poles created by current flowing through said stator coils in an amount of about 90 electrical degrees around said axis.

10. An induction motor as claimed in claim 1 wherein:
the extremities of said conductors and said stator coil means are displaced from one another at one of the ends of said rotor and said stator in an amount of about 90 electrical degrees around said axis, the ends of said stator coil means at the ends of said stator are displaced around said axis so as to achieve said displacement of the extremities of said conductors and said stator coil means, said auxiliary winding means includes an auxiliary coil means, the ends of said auxiliary coil means being directly connected to one another so as to short out said auxiliary winding means and connect said auxiliary coil means in an endless series, said auxiliary winding means are located within said stator so that the magnetic poles caused by current flow in said auxiliary winding means are displaced from the magnetic poles created by current flowing through said stator coils in an amount of about 90 electrical degrees around said axis.

11. An induction motor as claimed in claim 1 wherein:
the extremities of said conductors and said stator coil means are displaced from one another at one of the ends of said rotor and said stator in an amount of about 90 electrical degrees around said axis, the ends of said stator coil means at the ends of said stator are displaced around said axis so as to achieve said displacement of the extremities of said conductors and said stator coil means, said auxiliary winding means includes an auxiliary coil means, the ends of said auxiliary coil means being connected to one another through a capacitor, said auxiliary winding means are located within said stator so that the magnetic poles caused by current flow in said auxiliary winding means are displaced from the magnetic poles created by current flowing through said stator coils in an amount of about 90 electrical degrees around said axis.

12. An induction motor as claimed in claim 1 wherein:
the extremities of said conductors and said stator coil means are displaced from one another at one of the ends of said rotor and said stator in an amount of about 90 electrical degrees around said axis, the ends of said stator coil means at the ends of said stator are displaced around said axis so as to achieve said displacement of the extremities of said conductors and said stator coil means, a second auxiliary winding means located within said stator and positioned with respect to said stator coil means so that the magnetic poles caused by current flow in said second auxiliary winding means are displaced from the magnetic poles created by current flowing through said stator coil means and are displaced from the magnetic poles created by current flowing through said stator coil means, and from the magnetic poles created by current flowing through said first-mentioned auxiliary winding means, and switch means for controlling current flow in both of said auxiliary winding means, said switch means being capable of connecting extremities of either of said auxiliary winding means so as to short out the same in an endless path when the extremities of the other of said auxiliary winding means are not connected so that no current will flow through the other of said auxiliary winding means, the direction of said rotor rotation being dependent upon which said auxiliary winding means has its extremities connected, said auxiliary winding means are located within said stator so that the magnetic poles caused by current flow in said auxiliary winding means are displaced from the magnetic poles created by current flowing through said stator coils in an amount of about 90 electrical degrees around said axis.

13. In an AC, single-phase induction electric motor having a stator and a rotor;

said stator having stator coil means for creating a stator magnetic field, said stator coil means being adapted to be connected to an AC current source, said rotor being rotatably mounted with respect to said stator, having electrical conductors extending along the length thereof and means electrically connected the ends of said conductors, the improvement which comprises:

said conductors and said stator coil means being located so that the magnetic poles caused by current flowing through said coil means and caused by induced currents in said conductors are physically displaced from one another about 90 electrical degrees at the opposite extremities of said stator and said rotor at the start of rotation of said rotor and, auxiliary winding means for creating a further magnetic field physically located at one of the extremities of said stator about 90 electrical degrees displaced from the poles of said stator coil means, said auxiliary winding means extending only part of the length of said stator coil means and said rotor, and being unconnected to said current source.

14. An electric motor as claimed in claim 13 wherein:

said stator coil means consists of a plurality of stator coils connected in series, said auxiliary winding means comprises a plurality of auxiliary winding coils, each of said coils being located so as to extend between two of said stator coils, said coils being connected in an endless series.

15. An electric motor as claimed in claim 14 wherein:

said displacement is accomplished by offsetting the ends of said stator coils so that an end of each stator coil is offset from the other end of the same coil by 90 electrical degrees.

16. An electric motor as claimed in claim 14 including:

a second auxiliary winding means comprising a plurality of second auxiliary winding coils, each of said second auxiliary winding coils being located so as to extend between two of said stator coils, said second auxiliary winding coils being connected in an endless series and being located for creating still further magnetic fields at the other of said extremities of said stator about 90 electrical degrees displaced from the poles of said stator coil means, said auxiliary winding means being displaced in different directions from said stator coil means, a switch means located in series with each of said auxiliary winding means, said rotor normally rotating in one direction when one of said switch means is closed and the other is open and rotating in the other direction when the previously open switch means is closed and the previously closed switch means is open.

17. An electric motor as claimed in claim 14 including:

a capacitor connected in series between the ends of said auxiliary winding means.

18. A method of causing rotor rotation in a single phase induction motor having a stator with stator coil means for creating stator magnetic flux and having a rotor with conductors therein for carrying current induced by said stator magnetic flux which comprises:

passing a current through said stator coil means for creating stator magnetic flux, inducing current in said conductors by said stator magnetic flux, creating an induced rotor magnetic flux field by current flowing in said rotor conductors, inducing a current as a result of said rotor magnetic flux field in auxiliary coil windings located in said stator at one end of said stator so as to be displaced around the axis of said stator from said stator coil means, creating an auxiliary magnetic flux field by the current passing through said auxiliary coil means which is displaced around the axis of said stator from said stator flux field and in an opposition to part of the field created by current flowing through said rotor conductors, the opposition of said magnetic fields serving to exert a force causing rotor rotation.

PO-1050
(5/69)

UNITED STATES PATENT OFFICE
CERTIFICATE OF CORRECTION

Patent No. 3,599,023     Dated August 10, 1971

Inventor(s) Gerald W. Bottrell

It is certified that error appears in the above-identified patent and that said Letters Patent are hereby corrected as shown below:

Column 3, line 33, "90" should be --believed--;

Column 4, line 49, --line-- should follow the word "cycle"

Signed and sealed this 4th day of January 1972.

(SEAL)
Attest:

EDWARD M. FLETCHER, JR.     ROBERT GOTTSCHALK
Attesting Officer            Acting Commissioner of Patents